United States Patent
Zhu et al.

(10) Patent No.: US 11,926,932 B2
(45) Date of Patent: Mar. 12, 2024

(54) MULTI-COMPONENT SHAPE MEMORY THREADS, FIBERS, TUBES, TAPES AND METHOD FOR PRODUCING THE SAME

(71) Applicant: Nano and Advanced Materials Institute Limited, Hong Kong (HK)

(72) Inventors: Yong Zhu, Hong Kong (HK); Song Wang, Hong Kong (HK); Jianping Han, Hong Kong (HK); Chenmin Liu, Hong Kong (HK)

(73) Assignee: Nano and Advanced Materials Institute Limited, Hong Kong (HK)

( * ) Notice: Subject to any disclaimer, the term of this patent is extended or adjusted under 35 U.S.C. 154(b) by 16 days.

(21) Appl. No.: 17/344,929

(22) Filed: Jun. 10, 2021

(65) Prior Publication Data
US 2021/0404093 A1    Dec. 30, 2021

Related U.S. Application Data (60) Provisional application No. 63/102,630, filed on Jun. 24, 2020.

(51) Int. Cl.
*D01F 8/04* (2006.01)
*C08L 75/06* (2006.01)
(Continued)

(52) U.S. Cl.
CPC .............. *D01F 8/04* (2013.01); *C08L 75/06* (2013.01); *C08L 75/08* (2013.01); *D02G 3/045* (2013.01);
(Continued)

(58) Field of Classification Search
CPC ..... D01F 8/04; D01F 8/06; D01F 8/12; D01F 8/14; D01F 8/16; Y10T 428/2929;
(Continued)

(56) References Cited

U.S. PATENT DOCUMENTS

2005/0177246 A1* 8/2005 Datta .................. A61F 2/88
                                                         623/1.38
2009/0130391 A1    5/2009 Taya
(Continued)

FOREIGN PATENT DOCUMENTS

CN    110372922 A    10/2019
CN    110512308 A    11/2019

OTHER PUBLICATIONS

Office Action of corresponding China Patent Application No. 202110678187.0 dated Mar. 8, 2023.

*Primary Examiner* — Jeremy R Pierce
*Assistant Examiner* — Christine X Nisula
(74) *Attorney, Agent, or Firm* — Idea Intellectual Limited; Margaret A. Burke; Sam T. Yip (57) ABSTRACT

The invention relates to multi-component shape memory threads, fibers, tubes, or tapes, which includes at least two shape-memory polymeric (SMP-N) components. Each of the at least two SMP-N components is of at least 1% of the total weight, and N is a positive integer starting from 1, and the SMP-N components have a selectively engineered shape recovery temperature ($T_r$) between approximately 0° C. to 130° C. Also, when $T_{rN}$ and $T_{rN+1}$ are higher than room temperature, the threads, fibers, tubes, or tapes are configured to assume a substantially helical configuration upon heating to above $T_{rN}$ and lower than $T_{rN+1}$ by a stimulus when an elongation of the threads, fibers, tubes, or tapes is approximately 30% to approximately 300%, and having a coil diameter from 0.5 to 10 mm and a number of the turns per cm from 5 to 30.

17 Claims, 4 Drawing Sheets

(include SMP-1, SMP-2, SMP-3, SMP-4, etc)

(include SMP-1, SMP-2, SMP-3, SMP-4, etc)

(51) Int. Cl.
  *C08L 75/08* (2006.01)
  *D02G 3/04* (2006.01)
  *D02G 3/38* (2006.01)

(52) U.S. Cl.
  CPC .......... *D02G 3/38* (2013.01); *C08L 2201/12* (2013.01); *C08L 2203/12* (2013.01); *C08L 2205/025* (2013.01); *D10B 2401/046* (2013.01)

(58) Field of Classification Search
  CPC ........ D10B 2401/046; D10B 2401/061; C08L 2201/12; D01D 5/22
  See application file for complete search history.

(56) References Cited

U.S. PATENT DOCUMENTS

| | | |
|---|---|---|
| 2010/0028686 A1 | 2/2010 | Xie |
| 2011/0052861 A1* | 3/2011 | Rock ................. A41D 31/06 428/92 |
| 2011/0217547 A1 | 9/2011 | Mather et al. |
| 2015/0140886 A1 | 5/2015 | Kapsali |

* cited by examiner

MULTI-COMPONENT SHAPE MEMORY THREADS, FIBERS, TUBES, TAPES AND METHOD FOR PRODUCING THE SAME

CROSS-REFERENCE TO RELATED APPLICATIONS

The present application claims priority from U.S. provisional patent application Ser. No. 63/102,630 filed Jun. 24, 2020, and the disclosure of which is incorporated herein by reference in its entirety.

FIELD OF THE INVENTION

The present invention generally relates to a substantially linear multi-component threads, fibers, tubes, or tapes, and method of using thereof.

BACKGROUND OF THE INVENTION

Shape memory polymers (SMP) are materials that have a first, "permanent" configuration and a second "temporary" configuration that results from deformation of the material. Upon receiving an external stimulus, such as heat, solvent, electrical current, light, magnetic field, change of pH and thermal stimulus, the material returns to its permanent configuration. That is, the material "remembers" its original shape and returns to that shape after undergoing the external stimulus.

Shape memory filaments and fibers can be made by melt-spun, wet-spun and dry-spun methods. In such smart fibers, the shape memory function can be preserved, i.e. deformation can be memorized by a reversible phase and the original shape can be recovered when triggered by an external stimulus. For example, U.S. Patent Application Publication No. US20090093606A1 describes SMP fiber manufacturing process by using various synthesis and spinning procedures to obtain shape memory function in fibers. Such shape memory effect represents the simple deformation of the whole fiber length and its smart function is generated from single component fibers composed of shape memory polymers.

Bi-component filaments and fibers have been widely developed as a new type of man-made fibre since the 1960s. Through such technology, two different polymers with suitable viscosity, composition are co-extruded together into one filament through a spinneret from two separate extenders. The cross section of the filament can be different patterns, including concentric sheath/core, eccentric sheath/core, side-by-side, pie wedge, islands/sea mode, which depends on an application requirement.

For example, Chinese Patent Published Application No. CN104342802A discloses a double-component composite elastic fiber. The fiber disclosed therein was an extended filament which is formed by parallel composite spinning of polybutylene terephthalate and polyethylene glycol terephthalate according to a weight ratio of (70: 30)-(30:70), a crimp number of the fiber is 55-75/25 mm, and the crimp radius is below 1.0 mm. After thermal treatment, the elastic elongation ratio of the fiber was 80%-120%, and the elastic recovery ratio of the fiber was above 92%.

Chinese Patent Published Application No. CN101126180A discloses a side-by-side bi-component elastic fiber and its preparation method. In that Chinese application, by using the shrinkage PET, PBT or PTT, any two juxtaposed composite polymers can generate a spring-like crimping formation with better elasticity after extending heating treatment, by virtue of the difference in shrinkage properties.

PCT published application number WO 2009099548 A2 describes a method for producing self-crimping fluoropolymer(s) and perfluoropolymer(s) filaments comprising: heating said fluoropolymer(s) and/or said perfluoropolymer(s) to a molten state, extruding said fluoropolymer(s) and/or said perfluoropolymer(s) under pressure through spinneret plate(s) orifice(s) which create a filament, as a molten polymer that exhibits differential die swell, wherein said filament, as a molten polymer expands sectionally and continuously along a longitudinal length of the resultant filament, and wherein said spinneret plate orifice(s) comprise a round hole shape with an ellipsoid peninsula creating an ellipsoid cove gap in one section of said filament, as a molten polymer and differential die swell on opposing sides of said ellipsoid cove gap close the gap creating a seam between said opposing sides such that differential die swell around said ellipsoid cove gap creates uneven stresses along one portion of resulting filament thereby causing said filament to crimp, bend, deform and/or twist toward said seam in a preferred manner.

U.S. Patent Application Publication Ser. No. 4,424,257 discloses a self-crimping multi-component polyamide filament and a process for producing the filament. In its simplest form, the filament was composed of two components, and each of which comprises a polyamide of the same chemical composition, and one of which contains a minor amount of a polyolefin admixed with the polyamide. The filament was formed by co-extruding the components to form a conjugate filament that is attenuated in the molten state, solidified and then collected. Attenuation of the filament in the molten state imparted self-crimping properties and molecular orientation to the filament.

However, the filaments and fibers in all the aforementioned patent applications are limited to twocomponents, and they are difficult to transform freely between linear or curled/helical shapes. In view of the disadvantages of the existing SMPs, there is a need to provide a fiber, filament, or tape, which has a stable, controllable, and tunable crimping shape at different conditions.

SUMMARY OF THE INVENTION

Accordingly, a first aspect of the present invention provides multi-component shape memory threads, fibers, tubes, or tapes, which include at least two shape-memory polymeric (SMP-N) components. Each of the at least two SMP-N components is of at least 1% of the total weight, and N is a positive integer starting from 1 (include components SMP-1, SMP-2, SMP-3, SMP-4, etc), and the SMP-N components have a selectively engineered shape recovery temperature ($T_r$) between approximately 0° C. to 130° C., and the recovery temperature of two or more different components can be represented by $T_{rN}$ and $T_{rN+1}$ respectively.

In accordance with one embodiment, when the at least two SMP-N components are SMP-1 and SMP-2, the SMP-1 and SMP-2 are co-extruded at a weight ratio of 1-10: 10-1.

In accordance to one embodiment, the $T_r$ ($T_{r1}$) of SMP-1 is lower than that of the SMP-2($T_{r2}$), and the $T_r$ is either the melting point or glass transition temperature of the SMP-1 and the SMP-2.

In accordance with one embodiment, $T_{r1}$ of the SMP-1 is approximately 40° C., and $T_{r2}$ of the SMP-2 is approximately 60° C.

In accordance with one embodiment, when $T_{rN}$ and $T_{rN+1}$ are higher than room temperature, the threads, fibers, tubes, or tapes are configured to assume a substantially helical configuration upon heating to above the $T_{rN}$ and lower than the $T_{rN+1}$ by a stimulus when an elongation of the threads, fibers, tubes, or tapes is approximately 30% to approximately 300%, and having a coil diameter from 0.5 to 10 mm and a number of the turns per cm from 5 to 30.

In accordance with one embodiment, the stimulus comprises temperature, moisture/water, light, pH, and radiation.

In accordance with one embodiment, the threads, fibers, tubes, or tapes are configured to assume a substantially linear shape upon heating to above the $T_{rN+1}$ by the stimulus.

In accordance with one embodiment, the cross-sections of the at least two SMP-N components are in side-by-side, eccentric sheath/core, circumferential, or layer-by-layer structure.

In accordance with one embodiment, the threads or fibers have a diameter in a range of approximately 0.1 to 2 mm.

In accordance with one embodiment, the tubes or tapes have a thickness in a range of approximately 0.5 to 1 mm.

In accordance with one embodiment, the SMP-N components have a selectively engineered shape recovery temperature $(T_r)$ between approximately 0° C. to 130° C.

A second aspect of the present invention provides a method for producing the multi-component shape memory threads, fibers, tubes, or tapes, the method includes co-extruding multi-components together to form the threads, fibers, tubes, or tapes. The multi-components contain at least two shape-memory polymeric (SMP-N) components, and each of the at least two SMP-N components is of at least 1% of the total weight, and N is a positive integer starting from 1, including components SMP-1, SMP-2, SMP-3, SMP-4, etc.

In accordance with one embodiment, the at least two SMP-N components are co-extruded through a spinneret, T-die, a side-by-side nozzle, or a slot die coater.

Compared with the self-crimping filaments and shape memory filaments on the market, the present invention discloses multi-component threads, fibers, tubes or tapes with the "stimulus regulating shape change" function after stretching. The present invention has the following advantages: (1) the crimping shape of such threads, fibers, tubes or tapes can be easily formed through stimulus such as heating after stretching; (2) the crimping extent is easily controlled by adjusting the stretching ratio when in use; and (3) the crimping shape can be easily removed by subsequent heating to a higher temperature and restored to the straight shape.

The potential applications of the multi-component threads, fibers, tubes and tapes include toy, household product, biomedical device, sensors and actuators, textile and decoration products, etc.

BRIEF DESCRIPTION OF THE DRAWINGS

Embodiments of the present invention are described in more detail hereinafter with reference to the drawings, in which.

DETAILED DESCRIPTION

The present invention will be described in detail through the following embodiments with appending drawings. It should be understood that the specific embodiments are provided for an illustrative purpose only, and should not be interpreted in a limiting manner. Those skilled in the art will appreciate that the invention described herein is susceptible to variations and modifications other than those specifically described.

The invention includes all such variation and modifications. The invention also includes all of the steps and features referred to or indicated in the specification, individually or collectively, and any and all combinations or any two or more of the steps or features. Other aspects and advantages of the invention will be apparent to those skilled in the art from a review of the ensuing description.

Figure 1:
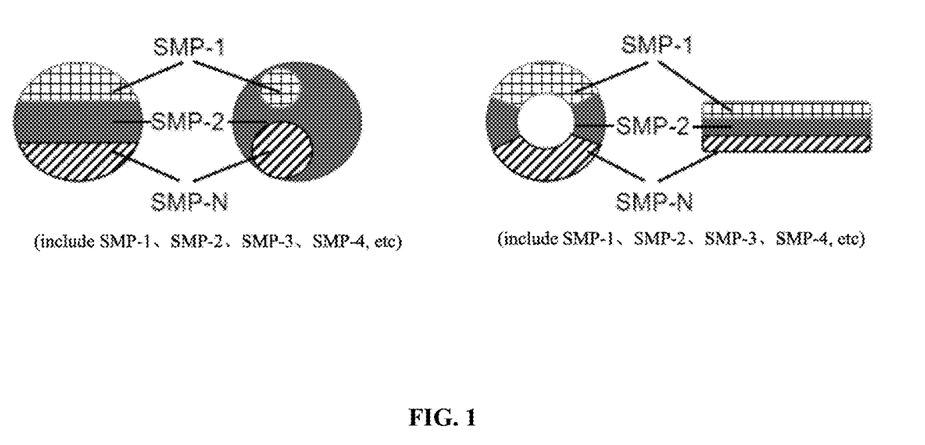
FIG. 1 illustrates different embodiments of the present invention in terms of different arrangement of the shape-memory polymer (SMP) from the cross-sectional view in order to result in different three-dimensional structure of the present invention.

Turning now to the drawings in detail, FIG. 1 schematically depicts the cross section of multi-component threads, fibers, tubes, or tapes, which are composed of at least three shape memory polymers (SMPs). These SMPs are co-extruded through a spinneret, T-die, a side-by-side nozzle, or a slot die coater. From left to right, the structure of side-by-side in thread, eccentric sheath/core in fiber, circumferential in tube and layer-by-layer in tape is listed. The multi-component thread or fiber has a diameter in a range of approximately 0.1 to 2 mm, and the multi-component tube or tape has a thickness in a range of approximately 0.5 to 1 mm. The multi-component threads, fibers, tubes, or tapes have the function of stimulus regulating multi-shape change after stretching. The quantity of shape changes after stretching depends on the amount of SMP components in the multi-components threads, fibers, tubes and tapes.

The quantity of SMP components is no less than two. In particular, at least two SMP-N components can be potentially used in the multi-component threads, fibers, tubes and tapes(i.e. include components SMP-1, SMP-2, SMP-3, SMP-4, etc). Each of the at least two SMP-N components is of at least 1% of the total weight, and a weight ratio between the at least two SMP-N components is 1:10.

In one embodiment, the SMPs have a glass transition temperature $(T_g)$ and/or melting temperature (Tm) used as the shape recovery temperature $(T_r)$ of SMPs. The $T_r$ of all SMP-N components is between approximately 0° C. to 130° C.

In another embodiment, when the at least two SMP-N components are SMP-1 and SMP-2, the $T_r$ $(T_{r1})$ of SMP-1 is lower than that of the SMP-2$(T_{r2})$, in which $T_{r1}$ of the SMP-1 is approximately 40° C., and $T_{r2}$ of the SMP-2 is approximately 60° C. The SMP-1 and SMP-2 are co-extruded at a weight ratio of 1-10: 10-1 to formed a bi-component shape memory thread, fiber, tube, or tape.

Examples of SMPs used in the present invention include, but are not limited to polyester-based or polyether-based shape memory polyurethane, where polyester-based SMP includes but not limited to polycaprolactone-based SMP.

In one embodiment, the SMPs are expected to include, but not limit to, Diaplex 2520, 3520, 4520. However, the materials of SMPs are not limited to thermal-sensitive shape memory polymers, but includes other polymers that are sensitive to other stimuli, such as moisture/water-sensitive shape memory polymers, photosensitive shape memory polymers, and radiation-sensitive shape memory polymers.

The multi-component thread, fiber, tube or multi-component tape can be stretched and at least partially fix the elongated shape to form the first shape from the original shape. After stretching under normal conditions, subsequent stimulation on the first shape changes the first shape to the second helical shape. Finally, when the threads, fibers, tubes and tapes in the second shape are triggered by the stimulus, it will lead to the shape change from the second shape to the third linear shape, which is equivalent to the original shape.

Figure 2:
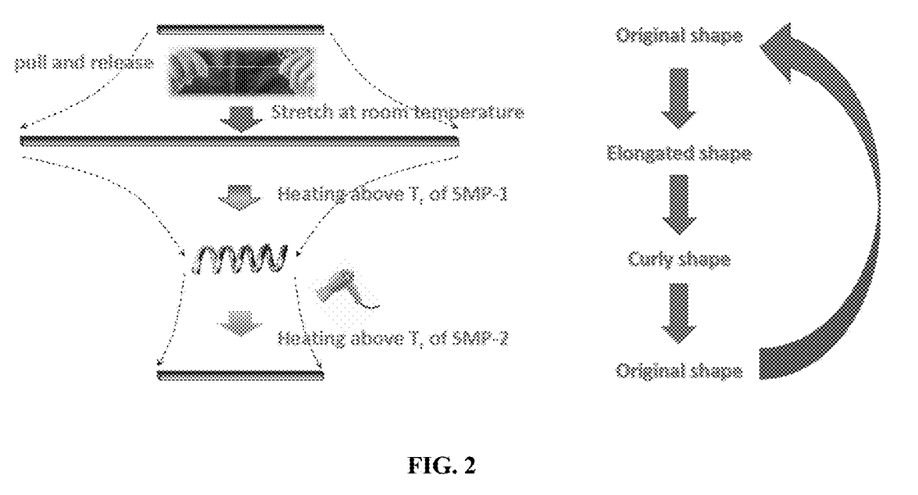
FIG. 2 illustrates procedures of achieving multi-shape change function of a multi-component shape memory filament.

Referring to FIG. 2, in one embodiment, when two thermal-sensitive SMP components SMP-1 and SMP-2 are used in a multi-component filament, it presents the stimulus regulating multi-shape change after stretching. Both SMP-1 and SMP-2 provides pseudo-plasticity at a temperature lower than $T_r$ of the SMPs. For example, $T_{r1}$ is higher than the room temperature and lower than the $T_{r2}$. After stretching and releasing at room temperature, the pseudo-plasticity in both SMP-1 and SMP-2 sides tend to maintain elongation. Therefore, an elongated straight shape can be obtained after stretching. Subsequently, if heating above $T_{r1}$ and lower than $T_{r2}$, the pseudo-plasticity of the SMP-1 will be removed and return to an elastic state, which causes the formation of a curly shape instantly. If continuously heating above $T_{r2}$, the pseudo-plasticity of SMP-2 will be removed and the original linear shape will be restored.

In the case of different stimulus modes, the first stimulus for SMP-1 component may lead to the first shape change and the second stimulus for SMP-2 component may lead to the second shape change. The stimulus may be selected from temperature, moisture/water, light, pH, and radiation. In FIG. 2, $T_{r1}$ is higher than room temperature and lower than the $T_{r2}$. Stretching the filament to an elongation of 30-300% at a room temperature can give rise to an elongated straight shape, and subsequently heating to $T_{r1}$ can lead to a curled/helical shape. If continuously heating above $T_{r2}$, the shape can be restored from the curled/helical shape back to the original straight shape.

Moreover, the present invention further includes an optional elastomeric component. The elastomer and a variety of SMP-N components are in side-by-side or eccentric sheath/core (for thread/fiber), or circumferential (for tube) and/or layer-by-layer (for tape) structure. The weight ratio in multi-component threads, fibers, tubes, tapes between the elastomer and a variety of SMP components, the stretching ratio and the type of SMP are used to control the shape. In one embodiment, the weight ratio between the elastomeric component and the SMP-N components is at least 5%.

In the present disclosure, a method for producing the multi-component threads, fibers, tubes, tapes is also provided. In particular, the method includes co-extruding multi-components together to form the threads, fibers, tubes, or tapes, which can realize the function of stimulus regulating multi-shape change after stretching. The multi-components include at least two shape-memory polymeric (SMP-N) components, and the at least two SMP-N components are co-extruded through a spinneret, T-die, a side-by-side nozzle, or a slot die coater.

In another embodiment, the present invention provides a method for producing the multi-component threads, fibers, tubes, tapes. In particular, the method includes co-extruding an elastomer and multi-components together to form the threads, fibers, tubes, or tapes by using a spinneret, T-die, a side-by-side nozzle, or a slot die coater.

The following examples illustrate the present invention and are not intended to limit the same.

EXAMPLE

Example 1

Two SMP-N components can be potentially used in the multi-component threads, fibers, tubes and tapes. Each of SMP-1 and SMP-2 components is of at least 1% of the total weight, and a weight ratio between the SMP-1 and SMP-2 components is 1:10. Diaplex MM3520 SMP, a polyether urethane-based shape memory polymer, is used in SMP-1, and polycaprolactone diol (Mn=10000) based SMP with MDI(4,4'-Methylenebis(phenylisocyanate)), BDO(1,4-Butanediol) in hard segments is used in SMP-2. $T_{r1}$ is 35° C., and $T_{r2}$ is 60° C. Stretching the multi-component threads, fibers, tubes and tapes to an elongation of 30-300% at a room temperature can give rise to an elongated straight shape, and subsequently heating to 35° C. can lead to a curled/helical shape. If continuously heating above 60° C., the shape can be restored from the curled/helical shape back to the original straight shape.

Example 2

For the multi-component thread with 1.2 mm diameter, Diaplex MM3520 SMP and polycaprolactone-based SMP are coextruded with a weight ratio of 7:3 (controlled by a melt flow pump) by using side-by-side nozzles. Prior to processing, all pellets must be dried at 104° C. for 2-4 hours. The barrel temperature of extruder would be 180-195° C. (zone 1), 185-200° C. (zone 2), 190-205° C. (zone 3), 190-200° C. (Die zone). Screw speed is 180-200 vrpm. Next, the extruded thread is cooled in cold water with a temperature of 15° C. from the nozzles without any stretching process.

Figure 3:
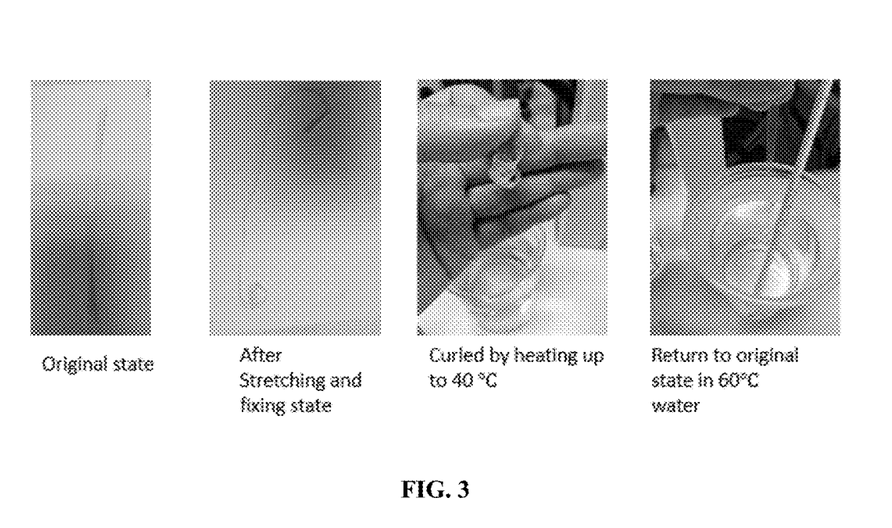
FIG. 3 illustrates images showing procedures of "stretching" and "releasing" the multi-component filament according to an embodiment of the present invention.

Referring to FIG. 3, the prepared multi-component filament has the function of temperature regulating multi-shape change after stretching. When the elongation is at least 100%, an elongated straight shape can be generated, and subsequent heating to 40° C. results in a curled/helical shape. The continuously heating above 60° C. gives rise to the shape recovery from the curled/helical shape back to the original straight shape.

Example 3

For bi-component filament with 1.2 mm diameter, Diaplex MM3520 SMP and Diaplex MM6520 SMP are co-extruded with a weight ratio of 8:2 (controlled by a melt flow pump) by using eccentric nozzles. Prior to processing, all pellets must be dried at 104° C. for 2-4 hours. The barrel temperature of extruder would be 180-195° C. (zone 1), 185-200° C. (zone 2), 190-205° C. (zone 3), 190-200° C. (Die zone). Screw speed is 180-200 rpm. Next, the extruded filament is cooled in cold water with a temperature of 15° C. from the nozzles without any stretching process.

The prepared multi-component filament has the function of temperature regulating multi-shape change after stretching. When the elongation is at least 100%, an elongated straight shape can be generated, and subsequent heating to 40° C. results in a curled/helical shape. The continuously heating above 70° C. gives rise to the shape recovery from the curled/helical shape back to the original straight shape.

Example 4

For the multi-component tape with 0.9 mm thickness, Diaplex MM3520 SMP and polycaprolactone-based SMP are coextruded with a weight ratio of 5:5 (controlled by a melt flow pump) by using a layer-by-layer slot die. Prior to processing, all pellets must be dried at 104° C. for 2-4 hours. The barrel temperature of extruder would be 180-195° C. (zone 1), 185-200° C. (zone 2), 190-205° C. (zone 3), 190-200° C. (Die zone). Screw speed is 180-200 rpm. Next, the extruded sheet is cooled in cold water with a temperature of 15° C. from the T-die without any stretching process.

Figure 4:
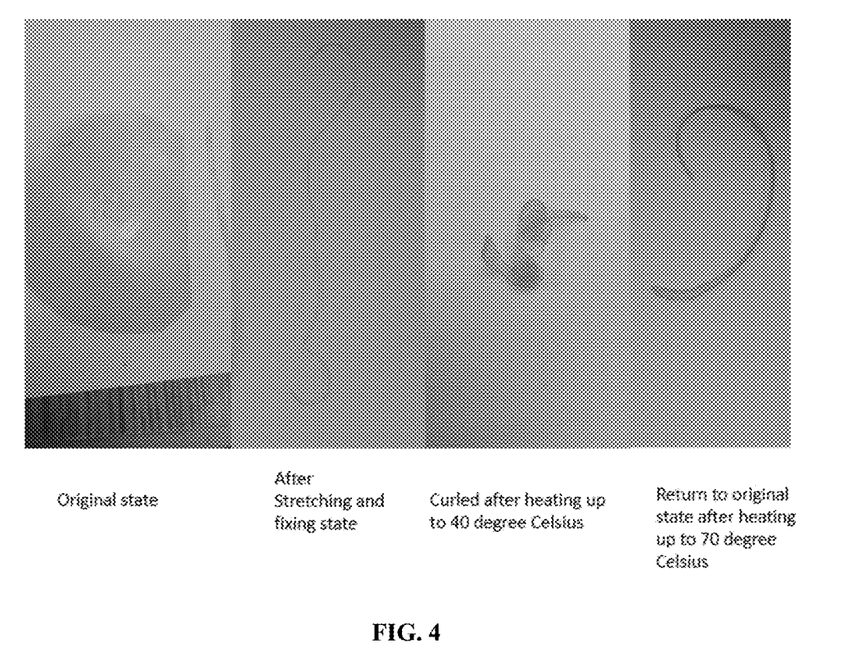
FIG. 4 illustrates images showing procedures of "stretching" and "releasing" the multi-component tape according to an embodiment of the present invention.

Referring to FIG. 4, the multi-component tape cut from the prepared sheet has the function of temperature regulating multi-shape change after stretching. When the elongation is at least 100%, an elongated straight shape can be generated, and subsequent heating to 40° C. results in a curled/helical shape. The continuously heating above 70° C. gives rise to the shape recovery from the curled/helical shape back to the original straight shape.

Definitions

Throughout this specification, unless the context requires otherwise, the word "comprise" or variations such as "comprises" or "comprising", will be understood to imply the inclusion of a stated integer or group of integers but not the exclusion of any other integer or group of integers. It is also noted that in this disclosure and particularly in the claims and/or paragraphs, terms such as "comprises", "comprised", "comprising" and the like can have the meaning attributed to it in U.S. Patent law; e.g., they allow for elements not explicitly recited, but exclude elements that are found in the prior art or that affect a basic or novel characteristic of the present invention.

Furthermore, throughout the specification and claims, unless the context requires otherwise, the word "include" or variations such as "includes" or "including", will be understood to imply the inclusion of a stated integer or group of integers but not the exclusion of any other integer or group of integers.

References in the specification to "one embodiment", "an embodiment", "an example embodiment", etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "linear" or "straight" used herein to describe a state of the present multi-component shape memory threads, fibers, tubes, or tapes refer to a closely or substantially linear state of an as-formed multi-component shape memory threads, fibers, tubes, or tapes of the present invention which can be observed visually or determined qualitatively and/or quantitatively.

The terms "fiber" used herein, refer to a three-dimensional structure with an elongated morphology. In some contexts, the term "fiber" can also refer to a slender threadlike object or article.

The term "shape memory polymer" or "shape-memory polymeric component" used herein, or sometimes they are used interchangeably, refers to a unique class of polymers or materials which exhibit the ability to fix a temporary shape and then resume to a prior state by an external stimulus (e.g. heat, radiation, solvent, electrical current, light, magnetic fields, or a change in pH).

The term "elastomer" or "elastomeric component" used herein, or sometimes they are used interchangeably, refers to a material which exhibits the property of elasticity, low Young's modulus (i.e. the ratio of tensile stress to tensile strain) and with the ability to deform when a stress is applied and resume to its original form (i.e., length, volume, shape, etc.) when the stress is removed. Examples of elastomers used in the present invention include, but are not limited to polyester or polyether-based polyurethanes.

Other definitions for selected terms used herein may be found within the detailed description of the present invention and apply throughout. Unless otherwise defined, all other technical terms used herein have the same meaning as commonly understood to one of ordinary skill in the art to which the present invention belongs.

It will be appreciated by those skilled in the art, in view of these teachings, that alternative embodiments may be implemented without undue experimentation or deviation from the spirit or scope of the invention, as set forth in the appended claims. This invention is to be limited only by the following claims, which include all such embodiments and modifications when viewed in conjunction with the above specification and accompanying drawings.

What is claimed is:

1. Multi-component shape memory threads, fibers, tubes, or tapes comprising:
   at least two shape-memory polymeric (SMP-N) components, wherein each of the at least two SMP-N components is of at least 1% of the total weight, and N is a positive integer starting from 1;
   wherein each of the at least two shape-memory polymeric components is selected from the group consisting of a polyester-based polyurethane shape memory material and a polyether-based polyurethane shape memory material;
   wherein the SMP-N components have a selectively engineered shape recovery temperature ($T_r$) between approximately 0° C. to 130° C., and when $T_{rN}$ and $T_{rN+1}$ are higher than room temperature and wherein $T_{rN+1}$ is greater than $T_{rN}$, the threads, fibers, tubes, or tapes are configured to assume a first shape change from an original shape to a straight, elongated shape in response to an elongation of the threads, fibers, tubes, or tapes to approximately 30% to approximately 300% of an original length and are configured to assume a second shape change to a substantially helical configuration upon heating to a temperature above the $T_{rN}$ and lower than the $T_{rN+1}$ and to assume a third shape change substantially back to the original shape upon heating to a temperature above $T_{rN+1}$.

2. The multi-component shape memory threads, fibers, tubes, or tapes according to claim 1, when the at least two SMP-N components are SMP-1 and SMP-2, the SMP-1 and SMP-2 are co-extruded at a weight ratio of 1-10: 10-1.

3. The multi-component shape memory threads, fibers, tubes, or tapes according to claim 2, wherein the $T_r$ ($T_{r1}$) of SMP-1 is lower than that of the SMP-2($T_{r2}$), and the $T_r$ is either the melting point or glass transition temperature of the SMP-1 and the SMP-2.

4. The multi-component shape memory threads, fibers, tubes, or tapes according to claim 3, wherein the $T_{r1}$ of the SMP-1 is approximately 40° C., and the $T_{r2}$ of the SMP-2 is approximately 60° C.

5. The multi-component shape memory threads, fibers, tubes, or tapes according to claim 1, wherein the cross-sections of the at least two SMP-N components are in side-by-side, eccentric sheath/core, circumferential, or layer-by-layer structure.

6. The multi-component shape memory threads, fibers, tubes, or tapes according to claim 1, wherein the threads or fibers have a diameter in a range of approximately 0.1 to 2 mm.

7. The multi-component shape memory threads, fibers, tubes, or tapes according to claim 1, wherein the tubes or tapes have a thickness in a range of approximately 0.5 to 1 mm.

8. A method for producing the multi-component shape memory threads, fibers, tubes, or tapes according to claim 1, comprising co-extruding multi-components together to form the threads, fibers, tubes, or tapes, wherein the multi-components comprise at least two shape-memory polymeric (SMP-N) components, wherein each of the at least two SMP-N components is of at least 1% of the total weight, and N is a positive integer starting from 1.

9. The method according to claim 8, wherein the SMP-N components have a selectively engineered shape recovery temperature ($T_r$) between approximately 0° C. to 130° C., and when $T_{rN}$ and $T_{rN+1}$ are higher than room temperature, the threads, fibers, tubes, or tapes are configured to assume a substantially helical configuration upon heating to above the $T_{rN}$ and lower than the $T_{rN+1}$ by a stimulus when an elongation of the threads, fibers, tubes, or tapes is approximately 30% to approximately 300%, and having a coil diameter from 0.5 to 10 mm and a number of the turns per cm from 5 to 30.

10. The method according to claim 9, when the at least two SMP-N components are SMP-1 and SMP-2, the SMP-1 and SMP-2 are co-extruded at a weight ratio of 1-10:10-1.

11. The method according to claim 10, wherein the $T_r$ ($T_{r1}$) of SMP-1 is lower than that of the SMP-2 ($T_{r2}$), and the $T_r$ is either the melting point or glass transition temperature of the SMP-1 and the SMP-2.

12. The method according to claim 11, wherein $T_{r1}$ of the SMP-1 is approximately 40° C., and $T_{r2}$ of the SMP-2 is approximately 60° C.

13. The method according to claim 9, wherein the stimulus comprises temperature, moisture/water, light, pH, and radiation.

14. The method according to claim 9, wherein the threads, fibers, tubes, or tapes are configured to assume a substantially linear shape upon heating to above the $T_{rN+1}$ by the stimulus.

15. The method according to claim 8, wherein the at least two SMP-N components are co-extruded through a spinneret, T-die, a side-by-side nozzle, or a slot die coater.

16. The multi-component shape memory threads, fibers, tubes, or tapes according to claim 1, wherein the polyester-based polyurethane shape memory material is a polycaprolactone-based shape memory material.

17. The multi-component shape memory threads, fibers, tubes, or tapes according to claim 1, wherein the helical configuration has a coil diameter from 0.5 to 10 mm and a number of the turns per cm from 5 to 30.

* * * * *